United States Patent [19]

Yaeger et al.

[11] Patent Number: 5,060,099
[45] Date of Patent: Oct. 22, 1991

[54] DISC DRIVE SLIDER LIFTER USING SHAPE MEMORY METALS

[75] Inventors: John R. Yaeger, Santa Clara County; Ramgopal Battu, Los Angeles County, both of Calif.

[73] Assignee: Seagate Technology, Inc., Scotts Valley, Calif.

[21] Appl. No.: 504,929

[22] Filed: Apr. 5, 1990

[51] Int. Cl.$^5$ .................. G11B 5/54; G11B 21/22
[52] U.S. Cl. .................................................. 360/105
[58] Field of Search ........................... 360/105; 337/140

[56] References Cited

U.S. PATENT DOCUMENTS 4,605,979  8/1986  Inoue ..................................... 360/105
4,684,913  8/1987  Yaeger ................................... 337/140

Primary Examiner—A. J. Heinz
Attorney, Agent, or Firm—Flehr, Hohbach, Test, Albritton & Herbert

[57] ABSTRACT

A slider lifter arrangement is provided for conventional disc drive assemblies. The slider lifter includes a wire support having a pair of wire support arms extending outward from a head positioning assembly adjacent opposite sides of a flexure arm that carries a slider. A lifting wire is strung between the opposing wire support arms in the space between the flexure arm and the disc surface. The lifting wire is formed from a shape memory alloy having martensitic and austenitic phase conditions. The wire is arranged to lift the flexure arm sufficiently to lift the slider off of the disc surface when the wire is in a first phase condition while allowing the slider to rest on the disc surface when the wire is in a second phase condition. The wire is selectively electrically heated to change its state from one phase condition to the other. The wire support is preferably formed integrally with the flexure assembly. The lifting wire is also preferably coated with an insulating material.

15 Claims, 2 Drawing Sheets

DISC DRIVE SLIDER LIFTER USING SHAPE MEMORY METALS

The present invention relates generally to disc drives. More particularly a lifter arrangement is provided for physically lifting the read/write heads off of the information storage discs during startup and shutdown. The lifter arrangement utilizes shape memory metals.

BACKGROUND OF THE INVENTION

Disc drive machines record and reproduce information stored on a recording media. Typical hard disc drives, often referred to as Winchester disc drives include one or more vertically aligned, rotating information storage discs, each having at least one associated magnetic read/write head or slider that is adapted to transfer information between the disc and an external computer system. The information storage discs are journaled about a spindle motor assembly capable of rotating the discs at high speeds. The sliders are carried by a plurality of vertically-aligned, elongated flexure arms that in turn are carried by a head positioner assembly. The head positioner assembly is adapted to move the sliders back and forth in unison across the face of the vertically-aligned discs. The head positioner assembly is traditionally either rotationally mounted or takes the form of a carriage that is free to move back and forth along a single axis. In either case, the head positioner assembly is adapted to precisely position the heads relative to the magnetic information storage discs.

In the typical operation of such a disc drive, the sliders rest on landing zones on the surface of their associated discs when the power is off. In operation, the drive unit is powered up and the disc pack begins to rotate. Once the disc reaches a certain critical speed, the sliders rise slightly off the landing zone under the lifting influence of a small air bearing which is created by the speed of rotation of the discs. During normal operation, the sliders remain floating above the discs are said to "fly" over the discs, thereby preventing wear on the disc surfaces and potential destruction of the data. However, until the sliders rise, there is considerable friction associated with the heads dragging over the discs, which causes wear to both the heads and the discs. When the drive unit is powered down, the same friction will occur between the surfaces of the heads and the rotating disc surfaces. In practice, breaking the heads free from the surface of the disc on which the sliders have been resting can require a considerable force to overcome the force which holds the two smooth surfaces together (called stiction).

In order to reduce this friction and minimize damage, the discs are coated with a protective layer and lubricants are applied to the disc surfaces. Additionally, the discs typically require a dedicated landing zone where the sliders can slide to a halt and rest when the drive unit is turned off. No data can be stored in this dedicated landing zone since repetitive starting and stopping of the disc tends to wear the landing zone. Consequently, the amount of data that can be stored on each disc is reduced. Moreover, a relatively large disc drive motor is required to overcome the adverse friction and stiction effects. Further, a motor brake is often also required to stop the rotation of the discs when the motor is turned off to reduce frictional wear.

Thus, it should be apparent that it is desireable to raise the sliders during power-up and to keep them up for a brief period after power-down until the disc pack has essentially come to a halt. Such an ability would eliminate the adverse effects of friction.

A wide variety of arrangements have been proposed to raise and lower the sliders at selected times. A few attempts have been made to take advantage of the shape memory metal phenomenon within the lifter mechanism. The phenomenon of shape memory is, of course, well understood. It is based on the thermoelastic martensitic transformation which is briefly explained hereunder. A shape memory alloy, such as Ti-Ni alloy, has a high temperature austenitic phase wherein the crystal structure is body center cubic. When cooled below its transformation temperature, the austenitic structure undergoes a diffusionless shear transform into a highly twinned martensitic crystal structure. In the martensitic phase, the alloy is easily deformed by the application of a small external force. However, in the austenitic phase, the alloy is very strong and is not easily deformed. When the alloy is heated through its transformation temperature, the martensitic phase is elastically returned to the austenitic phase (referred to as an inverse transformation) according to a given ordered crystal and orientation law. A notable characteristic of the alloy is the extremely large recovery force that is generated when returning to the austenitic phase. Therefore, the employment of a resilient force as a bias force capable of deforming the alloy in its martensitic phase permits the alloy to be used as a reversible actuator with temperature cycling. Further, since the recovery force which is generated with the return of the austenitic phase is quite large, it is possible to take advantage of the recovery force to do work.

It is important to the design of slider lifters to provide a device which raises and lowers the sliders without requiring significant modification of the design of the flexure arms. Avoiding substantial modification of the existing design of the flexure arms is a primary requirement of a successful device for loading and unloading the head. The lack of commercial success of prior-art designs is due in significant part to their attempts to seriously alter the flexure design. The reason is that in a conventional floating head slider, the head is expected to float in a stable fashion about 0.2 micrometers over the surface of the disc which is rotating at a constant speed. Therefore, the combined flexure arm and slider are very sensitive to their loading and air foil characteristics. Indeed, a great deal of time and effort has gone into their design. Accordingly, any design that requires modification of the flexure arm is looked upon with great disfavor. Another drawback of prior art designs is that they tend to require the assembly of a relatively large number of intricate parts. Such designs are disfavored since they add significantly to the costs of manufacturing and increase the probability of defective parts.

Two prior art patents representative of the use of shape memory alloy technology in lifter arrangement for magnetic disc drive apparatus are U.S. Pat. No. 4,605,979 (to Inoue) and 4,684,913 (to Yaeger). The devices described in both of these patents incorporate the use of shape memory alloys to attempt to provide a more efficient system for loading and unloading a transducer head from a disc surface. However, they both utilize relatively high profile devices which require significant spacing between adjacent discs. In present disc drive technology, such spacing is simply no longer available. To maximize the capacity of disc drives being manufactured, discs are spaced as closely as the supporting flexure will allow. In view of the foregoing, it should be apparent that it is important that the lifter design maintains an extremely low profile without requiring modification of the flexures' design.

The '979 discloses several potential designs for lifting the flexure to unload the slider. Each of the disclosed designs utilizes a resilient biasing member in combination with the shape memory alloy to load and unload the slider. In the sixth figure, a wire formed of shape memory metal extends forward from the guide bar upon which a load arm (flexure) is mounted. The wire is coated with a silicone resin which serves as the resilient biasing member. The silicone resin also serves to thermally insulate the wire. However, such an arrangement has the drawback of requiring a delicate coating of the shape memory wires in their martensitic state which adds to the complexity and costs of assembly.

SUMMARY OF THE INVENTION

Accordingly, it is a primary objective of the present invention to provide a compact slider lifter arrangement for disc drives that is capable of lifting sliders within a tightly spaced, small diameter disc pack. Another objective is to provide a slider lifter that is easy to assembly and has a low parts count.

To achieve the foregoing and other objects and in accordance with the purpose of the present invention, a slider lifter arrangement for conventional disc drives is disclosed which utilizes an element of a shape memory alloy to lift a transducer slider away from the surface of an associated disc. The slider lifter includes a wire support having a pair of extended wire support arms extending outward from a head positioning carriage adjacent opposite sides of a flexure arm that carries a slider. A lifting wire is strung between the opposing wire support arms in the space between the flexure arm and the disc surface. The lifting wire is formed from a shape memory alloy having martensitic and austenitic phase conditions. The wire cooperates with the flexure arm such that when the wire is in a first phase condition, it lifts the flexure arm sufficiently to lift the slider off of the disc surface. In contrast, when the wire is in a second phase condition, the flexure arm deforms the lifting wire such that the slider is allowed to rest on the disc surface. The wire is selectively electrically heated to change its state from one phase condition to the other.

In a preferred embodiment, the wire support is formed integrally with the flexure assembly. In other preferred embodiments, the lifting wire may take either a substantially U-shaped or a substantially straight orientation in the first phase condition. The lifting wire is also preferably coated with an insulating material.

In a further preferred embodiment, the flexure assembly includes a flexure arm, the pair of opposing support arms and a base portion having attachment means for coupling the flexure assembly to a positioning means.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

DETAILED DESCRIPTION OF THE DRAWINGS

In accordance with the present invention, a slider lifting arrangement is disclosed which is adapted to lift the read/write transducer heads in conventional disc drives off of the disc surfaces during startup and shutdown operations. The lifting arrangement includes a pair of support arms disposed on opposite sides of a flexure arm that carries the read/write transducer head (hereinafter referred to as the slider). A lifting wire formed from a shape memory alloy is strung between the opposing support arms and extends between the flexure arm and its associated disc surface.

Figure 1:
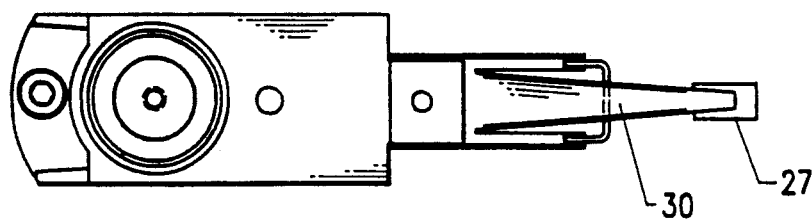
FIG. 1 is a diagrammatic top view of a head positioner assembly carrying a flexure assembly incorporating the present invention.
Figure 2:
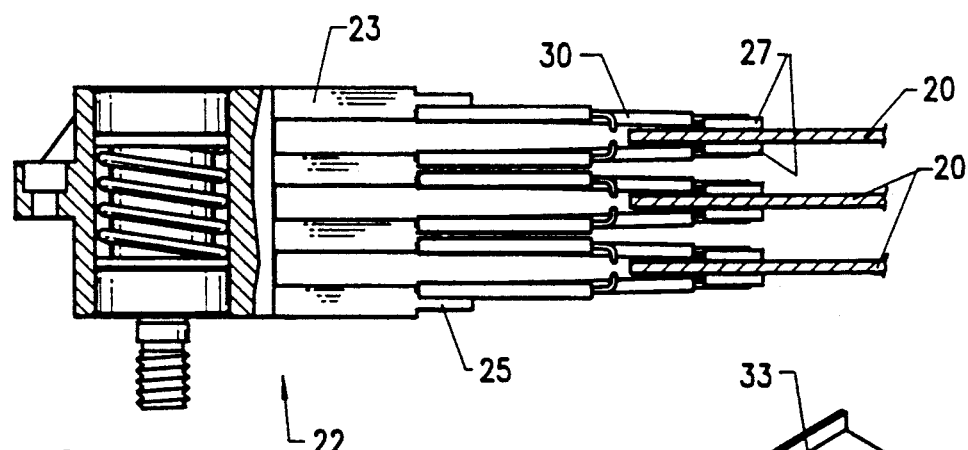
FIG. 2 is a diagrammatic side view of the head positioner assembly shown in FIG. 1.

Referring initially to FIGS. 1 and 2 a typical Winchester type disc drive suitable for incorporating the teachings of the present invention will be described. The disc drive includes one or more information storage discs in the form of magnetic discs 20 that are journaled about a spindle motor assembly within a housing having upper and lower casing members respectively. For clarity, only a portion of the information storage discs 20 are shown. In the embodiment of the disc drive chosen for the purpose of illustration, three spaced apart information storage discs 20 are utilized.

Each information storage disc 20 has a multiplicity of concentric information storage tracks for recording information. A conventional head positioner assembly 22 is rotatably mounted between the upper and lower casing in one corner of the housing. The head positioner assembly includes an E-block 23 having a plurality of vertically aligned support pads 25 each of which carries one or two flexure assemblies 30 that each carry a magnetic read/write data head (slider) 27 for reading information from and writing information onto the information storage discs 20. One of the flexure assemblies functions as a servo arm flexure which carries a servo head for accurately positioning the remaining sliders 27 relative to the information storage tracks. A voice coil motor (not shown) is adapted to precisely rotate the head positioner assembly back and forth such that the magnetic and servo heads move across the information storage discs.

Figure 3:
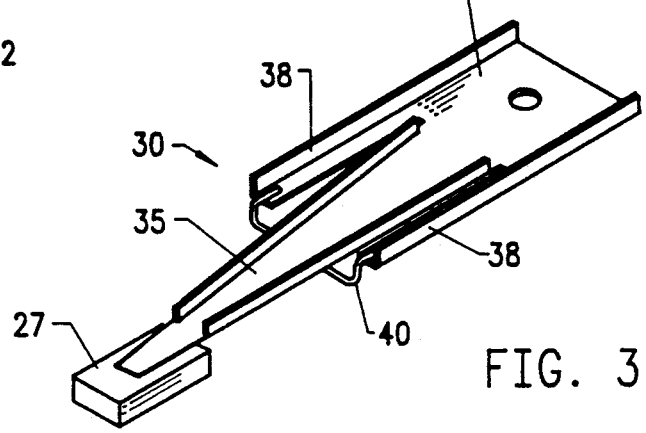
FIG. 3 is a perspective view of a first embodiment of a flexure assembly constructed in accordance with the present invention.

As seen in FIG. 3, a first embodiment of the flexure assembly 30 includes a base portion 33 for coupling the flexure assembly 30 to its associated support pad 25, an elongated flexure arm 35 that carries the slider 27 at its distal end and a pair of support arms 38 that extend along opposite sides of the flexure arm 35. A lifting wire 40 formed of a shape memory alloy is strung between the distal ends of opposing support arms 38.

Figure 4:
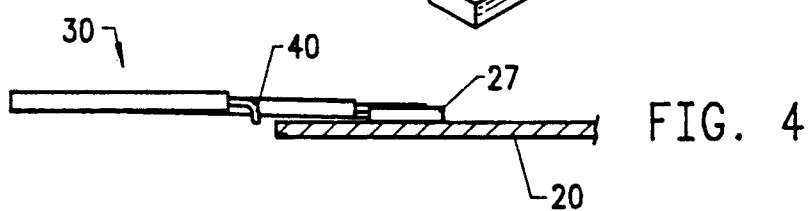
FIG. 4 is a diagrammatic side view of the flexure assembly shown in FIG. 3 installed with the lifting wire in a martensitic phase.
Figure 5:
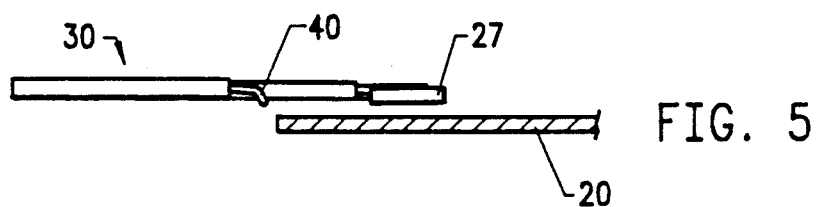
FIG. 5 is a diagrammatic side view of the flexure shown in FIG. 4 in a austenitic phase.
Figure 9:
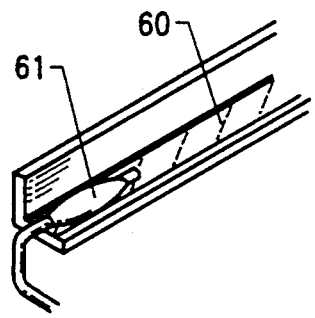
FIG. 9 is a top view of a coupling arrangement for providing electrical power to the shape memory wire.

The lifting wire 40 is substantially U-shaped, and as will be described in more detail below with respect to FIG. 9, is coupled to the distal ends of the support arms 38 in a manner which provides a good electrical connection between a power source and the lifting wire. The lifting wire 40 is formed from a shape memory alloy and is arranged to cooperate with the flexure arm to be moveable between a lowered, non-lifting position (as shown in FIG. 4) and a raised lifting position (as shown in FIG. 5). In the lifting position, the lifting wire engages its associated flexure arm to "lift" the flexure arm 35 and its associated slider 27 away from the surface of its associated information storage disc 20. In the lowered, non-lifting position, the resilient flexure arm deforms the lifting wire sufficiently to allow the slider 27 to rest upon the surface of the information storage disc 20, or fly over the surface of the disc as the disc rotates, free of positioning influence from the lifting wire 40.

The lift wire 40 is fabricated from a shape memory material. By way of example a shape memory metal alloy such as Ti-Ni works well. The shape memory alloy has a high temperature austenitic phase having a relatively high strength and a low temperature martensitic phase having a relatively low strength. At ambient and operational temperatures, the shape memory alloy is in its low temperature martensitic phase. When heated above its transition temperature, it reverts to its austenitic phase. Since the wire has a relatively small diameter, its temperature can be readily raised by passing an electrical current therethrough. The resistance of the small diameter wire is sufficient to accomplish the required heating.

The diameter of the lifting wire 40 is selected such that when the wire is in the austenitic phase, the resilience and weight of the flexure cannot significantly deform the lift wire. However, when the lift wire 40 is in the low strength martensitic phase, the resiliency of conventional flexures can be used advantageously to cooperate with the lifting wire to deform the lifting wire sufficiently to allow the slider to rest upon or fly above the surface of the drive. If desired, the shape memory wire may be formed to have some memory in its martensitic phase. Accordingly, when the lift wire 45 is allowed to cool to its martensitic phase, the sliders 27 are set down on the surface of the information storage discs 20.

With such an arrangement, whenever power is applied to the disc drive, that same power may be used to heat the lift wire 40, changing the lift wire from its martensitic phase to its austenitic phase. With the power applied, the slider is quickly lifted above the surface of the disc. When the drive is powered down, the current to the lift wire may be turned off allowing the lift wire to cool down. The cooling of the lift wire 40 induces a phase transformation to the martensitic condition. As the wire cools, the resilient force of the flexure arm 35 deforms the lift wire thereby gradually and slowly returning the slider to rest on the surface of the disc after power has been removed.

Alternatively, current to the lifting wire could be shut off after the drive reaches its operational speed which would allow the slider to settle into its normal suspended position above the disc during operation. Then, power would again be applied to the lifting wire just before power down to insure that the slider is lifted above the surface of the disc while the disc pack slows.

Figure 6:
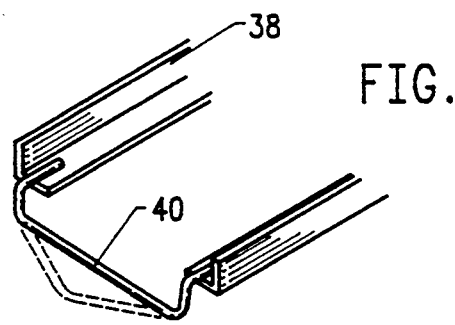
FIG 6 is diagrammatic perspective views of the lifting wire shown in FIG. 3 with the flexure arm removed.

The U-shape of the lifting wire 40 is particularly useful in drives requiring a relatively large displacement of the flexures. FIG. 6 diagrammatically shows the deformation that can occur within the lifting wire 40. The solid lines represent the position of the lifting wire in the hot austenitic phase, while the dashed lines represent the position of the lifting wire in the cold martensitic phase. It is noted that very little cantilevered "bend" occurs in the leg portions of the U-shaped member that are coupled directly to the support arms 38. Rather, there is considerable torsion. This allows the base portion of the U-shaped lifting wire to act like a bending beam. It should be appreciated that the actual dimensions of the U-shaped member 38 will vary a great deal depending upon the desired stroke for the lifting wire and the design of the flexure arm 35. By way of example, a 6 mil diameter U-shaped lifting wire having a length L of 0.025 inch extending beyond the support arms 38 and a width W of 0.1875 inch, may have a stroke of approximately 0.020 inch.

In modern disc drives, the information storage discs 20 within a disc pack are typically spaced as close together as the flexure design allows in order to minimize the required disc size. Therefore, in many disc drives such as most mini 2.5-inch disc drives, the flexures extend nearly parallel to the disc surface and accordingly strokes of 20 mils are not required. Indeed, in some applications, such a long stroke is undesirable. This is because, as indicated above, conventional sliders float about 0.2 micrometers above the surface of the discs which the associated transducer accesses. Although the actual floating height will vary somewhat between specific flexure designs, it is important to prevent the lifting wire from lifting the sliders too far above the disc surface so as not to interfere with the adjacent disc.

Figure 7:
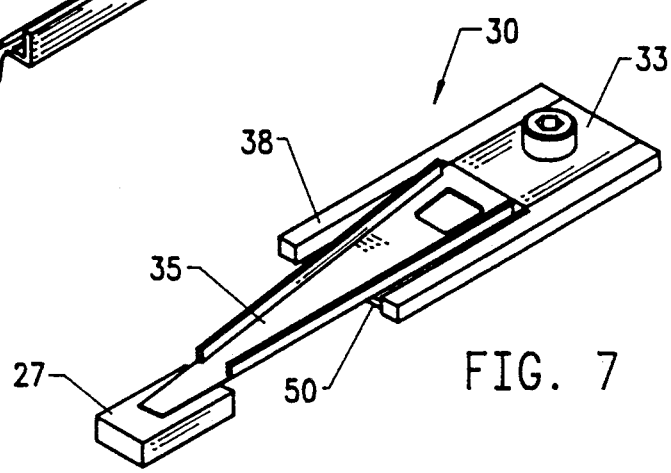
FIG 7 is a diagrammatic perspective view of a second embodiment of the invention.
Figure 8:
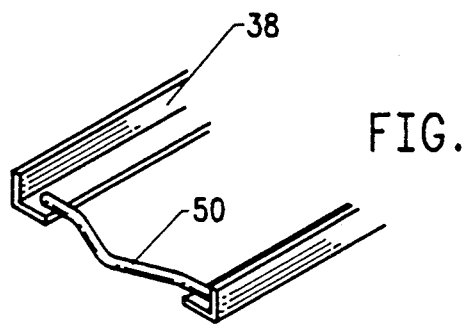
FIG. 8 is a diagrammatic perspective view of the lifting wire shown in FIG. 7 with the flexure arm removed.

Referring next to FIGS. 7 and 8 an alternative embodiment of the invention is shown wherein a straight lifting wire 50 replaces the U-shaped lifting wire described in the previous embodiment. In all other respects the flexure assembly of the second embodiment is identical to the flexure assembly of the first embodiment. It should be readily apparent that the lifting wire 50 will not have as large of a stroke as the U-shaped lifting wire. By way of example, a straight wire having a length L of 0.200 inches will have a stroke of approximately 7 mils.

In practice, the lifting wire must be electrically isolated from the metallic flexure arm 35 as well as the support arms 38. This may be accomplished by coating either the wire or the flexure arm with a insulating material such as a spray type TEFLON ® based coating. Such coatings work well since they are easily applied, resist abrasion and can be easily cleaned in addition to having good electrical insulating properties. In the preferred embodiment, the lifting wire is coated with the insulating layer which has the advantage of thermally insulating the wire. Since heat loss from the lifting wire is a bit of a concern due to the wires very thin diameter, such thermal insulation reduces heat loss due to air turbulence. This serves to decrease the amount of time required to lift the slider from the disc surface (since the wire heats to the transformation temperature faster), as well as to slow the return of the sliders to the disc surface (since the wire cools slower). The latter is particularly advantageous since it gives the disc pack a bit more time to slow to a stop.

Referring next to FIG. 9, electrical leads 60 carried by the opposing support arms 38 cooperate to supply electrical current to the lift wire 40. It is generally desireable to only activate the lifting wire to the raised position at the conclusion of operation so that the head may be either rested on the disc after the disc stops rotating, moved to a parking zone or moved to a ramp. To accomplish this, power must be supplied to the lift wire.

A potential source of power is the back emf of the spindle motor which rotates the disc pack; this back emf is generated during the power down phase of operation of the disc drive. With such an arrangement, whenever external power is withdrawn from the spindle motor and the discs are to stop rotating, then the shape memory wire changes to its austenitic phase and lifts the slider off of its associated disc. When the spindle motor is completely turned off and rotation ceases, the back emf ends, the wire 40 cools, and the flexure and slider reach their rest position. The lift wire is stretched under the influence of the flexure, which acts as a leaf spring, until the slider is brought to rest on the surface of the disc or other parking area. When the disc drive is again restarted, current may again be applied to the wire to lift the flexure and begin the return to normal operation. As soon as the disc is spinning at normal operating speed, power to the wire may be withdrawn, and the slider flies over the surface of the disc supported on the existing air bearing.

As seen in FIG. 9, the electrical leads may take the form of a printed circuit ribbon cables 60 that are laid on the support arms 38. Good electrical and mechanical connections between the ribbon cable and the lifting wire may be accomplished by soldering to form solder joint 61.

Because of their inherent characteristics, shape memory alloys remain relatively stiff until they are heated the first time. Therefore, when initially installed, the wire lifts the flexures somewhat which is helpful during the initial assembly of the drive.

Although only a couple embodiments of the present invention have been described herein, it should be understood that the present invention may be embodied in many other specific forms without departing from the spirit or scope of the invention. Particularly, it should be appreciated that the actual materials used for the various components, including the shape memory lifting wire may be widely varied. The positioning and arrangement of the various components including the support arms may also be widely varied. Indeed, the support arms may be carried by the E-block of the head positioning assembly as opposed to being formed as a part of the flexure assembly. The flexure assembly may be stamped as an integral piece as seen in FIG. 3, or may include a flexure arm 35 attached to a flexure support 33 as seen in FIG. 7.

It should also be appreciated that the simplified slider lifter structure set forth herein can be used regardless of the number of information storage discs and flexure assemblies that are used within a disc drive. That is each flexure can be provided with its own lifting arrangement. Therefore, the present examples and embodiments are to be considered as illustrative and not restrictive, and the invention is not to be limited to the details given herein, but may be modified within the scope of the appended claims.

we claim:

1. A slider lifter arrangement for a disc drive assembly including a housing, a rotatable information storage disc having a data storage surface, a flexure arm that carries a slider transducer for transferring information between the information storage disc and an external system, the flexure arm being designed such that when the disc is rotating at an operational speed, the slider flies above the surface of the disc and when the disc is stopped, the slider and flexure arm are at rest, and a head positioning means for positioning the slider relative to the information storage disc, the slider lifter comprising:
    a wire support carried by the head positioning means, the wire support having a pair of extended wire support arms extending outward from the head positioning means adjacent opposite sides of the flexure arm;
    a lifting wire strung between the opposing wire support arms in a space between the flexure arm and the disc surface, the lifting wire being formed from a shape memory alloy having martensitic and austenitic phase conditions, wherein the lifting wire cooperates with the flexure arm such that when the lifting wire is in a first phase condition, the lifting wire lifts the flexure arm to lift the slider further from the disc surface and when the wire is in a second phase condition, the flexure arm deforms the lifting wire such that the slider is allowed to rest or flip independently over the disc surface, and
    transform means for heating the lifting wire to change the state of the lifting wire from one of said phase conditions to the other said phase condition.

2. A slider lifter arrangement as recited in claim 1 wherein the wire support is a flexure support for coupling the flexure arm to the carriage means.

3. A slider lifter arrangement as recited in claim 2 wherein said flexure support is formed integrally with the flexure arm.

4. A slider lifter arrangement as recited in claim 1 wherein the lifting wire is substantially U-shaped in said first phase condition.

5. A slider lifter arrangement as recited in claim 1 wherein said first phase condition is the austenitic phase.

6. A slider lifter arrangement as recited in claim 5 wherein the lifting wire is formed from a Ti-Ni alloy.

7. A slider lifter arrangement as recited in claim 1 wherein the lifting wire is coated with an insulating material.

8. A slider lifter arrangement as recited in claim 1 wherein the lifting wire is substantially straight in said first phase condition.

9. A flexure assembly for a disc drive assembly comprising:
    a base portion having attachment means for coupling the flexure to a positioning means;
    a flexure arm extending outwardly from the base portion, the flexure arm carrying a slider and transducer for transferring information between an information storage disc and an external computer system;
    a pair of extended support arms extending outward from the base adjacent opposite sides of the flexure arm;
    a lifting wire strung between the opposing support arms, in a space between the flexure arm and the information storage disc, the lifting wire being formed from a shape memory alloy having martensitic and austenitic phase conditions, wherein the lifting wire cooperates with the flexure arm such that when the lifting wire is in a first phase condition, the lifting wire lifts the flexure arm to lift the slider further from the disc surface and wherein when the wire is in a second phase condition, the flexure arm deforms the lifting wire such that the slider is allowed to rest on or adjacent to the disc surface, or fly over the disc surface free of positioning influence by said lifting wire.

10. A flexure assembly as recited in claim 9 wherein the lifting wire is coated with an insulating material.

11. A flexure assembly as recited in claim 10 wherein the lifting wire is substantially U-shaped in said second phase condition.

12. A flexure assembly as recited in claim 10 wherein the lifting wire is substantially straight in said first phase condition.

13. A flexure assembly as recited in claim 10 wherein said first phase condition is the austenitic phase and the lifting wire is formed from a Ti-Ni alloy.

14. A disc drive comprising:
an information storage disc rotatably journaled about a spindle assembly, the information storage disc having a data storage surface;
a slider transducer for transferring information between the data storage surface and an external system;
carriage means for positioning the slider relative to the information storage disc;
a flexure assembly coupled to the carriage means, the flexure assembly including a flexure arm that carries the slider and a pair of extended wire support arms extending outward from the carriage means adjacent opposite sides of the flexure arm, the flexure arm being designed such that when the disc is rotating at an operational speed, the slider flies above the surface of the disc and when the disc is stopped, the slider rests on or adjacent the surface of the disc;
a housing for encasing the disc, flexure assembly, slider and carriage means;
a lifting wire strung between the opposing wire support arms in a space between the flexure arm and the disc surface, the lifting wire being formed from a shape memory alloy having martensitic and austenitic phase conditions, wherein the lifting wire cooperates with the flexure arm such that when the lifting wire is in a first phase condition, the lifting wire lifts the flexure arm to lift the slider further from the disc surface and when the wire is in a second phase condition, the flexure arm deforms the lifting wire such that the slider is allowed to rest or fly over the disc surface free of positioning influence by said wire; and
transform means for heating the wire to change the state of the wire from one of said phase conditions to the other said phase condition.

15. A disc drive as recited in claim 14 wherein the lifting wire is coated with an insulating material.

* * * * *